United States Patent
Di Bartolomeo et al.

(10) Patent No.: US 12,051,889 B2
(45) Date of Patent: Jul. 30, 2024

(54) TOWER, PARTICULARLY FOR A HIGH-VOLTAGE OVERHEAD ELECTRIC TRANSMISSION LINE, EQUIPPED WITH SWITCHGEAR UNIT AND RELATED PROTECTION, COMMAND AND CONTROL SYSTEM

(71) Applicant: TERNA S.P.A., Rome (IT)

(72) Inventors: Evaristo Di Bartolomeo, Rome (IT); Dario Polinelli, Rome (IT); Roberto Spezie, Rome (IT)

(73) Assignee: TERNA S.P.A., Rome (IT)

( * ) Notice: Subject to any disclaimer, the term of this patent is extended or adjusted under 35 U.S.C. 154(b) by 190 days.

(21) Appl. No.: 17/768,523

(22) PCT Filed: Oct. 14, 2020

(86) PCT No.: PCT/IB2020/059650
§ 371 (c)(1),
(2) Date: Apr. 13, 2022

(87) PCT Pub. No.: WO2021/074814
PCT Pub. Date: Apr. 22, 2021

(65) Prior Publication Data
US 2023/0361541 A1    Nov. 9, 2023

(30) Foreign Application Priority Data

Oct. 15, 2019  (IT) .................. 102019000018788
Oct. 15, 2019  (IT) .................. 102019000018803

(51) Int. Cl.
H02B 5/02    (2006.01)
H02B 5/06    (2006.01)
H02B 13/065  (2006.01)

(52) U.S. Cl.
CPC .............. *H02B 5/02* (2013.01); *H02B 5/06* (2013.01); *H02B 13/065* (2013.01)

(58) Field of Classification Search
CPC ... H02B 5/00; H02B 5/02; H02B 5/06; H02B 13/065
See application file for complete search history.

(56) References Cited

U.S. PATENT DOCUMENTS 2,689,888 A  *  9/1954  Viboud .................... H02B 5/02
                                                    218/43
4,956,742 A      9/1990  Takagi et al.
(Continued)

FOREIGN PATENT DOCUMENTS

CN    203398587 U    1/2014
CN    205025179 U    2/2016
(Continued)

OTHER PUBLICATIONS

International Search Report, issued in PCT/IB2020/059650, mailed Feb. 9, 2021, Rijswijk, NL.
(Continued)

*Primary Examiner* — Robert J Hoffberg
(74) *Attorney, Agent, or Firm* — ArentFox Schiff LLP; Michael Fainberg (57) ABSTRACT

A tower for a high-voltage overhead electric transmission line has a predetermined shape defining an internal volume of the tower, and carries a first tension side of a first line section and a second tension side of a second line section. The first and second tension sides have respective pluralities of first and second tension terminals, each associated with a respective phase of the high-voltage overhead electric transmission line. The tower supports a switchgear unit connected at a first end to the first line section and at a second end to the second line section and configured to modify grid configuration, interrupting and restoring electrical continu- (Continued)

ity in pre-established points, to interrupt nominal and fault currents, and to carry out safety operations. The switchgear unit has a plurality of switchgear unit poles, each associated with a respective phase of the high-voltage overhead electric transmission line and including a line circuit breaker and at least one line disconnector.

18 Claims, 10 Drawing Sheets

(56) References Cited

U.S. PATENT DOCUMENTS

| | | | | |
|---|---|---|---|---|
| 7,193,338 | B2 * | 3/2007 | Ghali | H02B 5/00 |
| | | | | 361/62 |
| 11,799,274 | B2 * | 10/2023 | Cameroni | H02B 5/06 |
| 2008/0061632 | A1 | 3/2008 | Couture et al. | |
| 2023/0048351 | A1 * | 2/2023 | Spezie | H02B 5/06 |
| 2024/0106208 | A1 * | 3/2024 | Di Bartolomeo | H02B 5/02 |

FOREIGN PATENT DOCUMENTS

| | | | | |
|---|---|---|---|---|
| CN | 108631311 | A * | 10/2018 | H02H 9/041 |
| CN | 207988628 | U * | 10/2018 | |
| CN | 208127843 | U | 11/2018 | |
| CN | 113009662 | A * | 6/2021 | G02B 6/4446 |
| DE | 29622637 | U1 | 3/1997 | |
| FR | 2706674 | A1 | 12/1994 | |
| JP | 5822220 | B1 | 11/2015 | |
| WO | 01/50487 | A1 | 7/2001 | |
| WO | WO-2021074812 | A1 * | 4/2021 | H02B 5/02 |
| WO | WO-2021074815 | A1 * | 4/2021 | H02B 3/00 |

OTHER PUBLICATIONS

ABB S.P.A, ABB switchgear provides safe and reliable power to busy streets of Bangkok, Dec. 19, 2017, pp. 1-3, XP055692863, Retrieved from the Internet, URL: https://new.abb.com/news/detail/45846/abb-switchgear-provides-safe-and-reliable-power-to-busy-streets-of-bangkok.

ABB S.P.A, Plug and Switch System PASS Introduction, Jul. 10, 2013, XP055692875, Retrieved from the Internet, URL: https://search-ext.abb.com/library/Download.aspx?DocumentID=2GJA708520%202008.08&LanguageCode=en&DocumentPartId=&Action=Launch.

* cited by examiner

TOWER, PARTICULARLY FOR A HIGH-VOLTAGE OVERHEAD ELECTRIC TRANSMISSION LINE, EQUIPPED WITH SWITCHGEAR UNIT AND RELATED PROTECTION, COMMAND AND CONTROL SYSTEM

CROSS-REFERENCE TO RELATED APPLICATIONS

This application is a National Phase Application of PCT International Application No. PCT/IB2020/059650, having an International Filing Date of Oct. 14, 2020 which claims priority to Italian Application No. 102019000018803 filed Oct. 15, 2019 and Italian Application No. 102019000018788 filed Oct. 15, 2019, each of which is hereby incorporated by reference in its entirety

FIELD OF THE INVENTION

This invention relates, in general, to the sector of high-voltage overhead electrical energy transmission; in particular, the invention refers to a tower for a high-voltage overhead electric transmission line equipped with a switchgear unit and which may be equipped with a protection, command and control system.

BACKGROUND OF THE INVENTION

A high-voltage overhead electric transmission line, obtained according to the prior art, extends from a first electrical substation to a second electrical substation.

In these electrical substations there are line circuit breakers designed to interrupt this high-voltage overhead electric transmission line when they are opened. These circuit breakers may be opened in case of need to carry out maintenance along a section, or along the whole transmission line, or when a fault occurs along said transmission line. In order to monitor voltage and current on the line, voltage transformers TV and current transformers TA are commonly installed at said circuit breakers, supplying the measurement and protection devices referable to the aforesaid transmission line. Disconnectors are also installed at the circuit breakers in order to ensure compliance with the electrical clearances provided for by good practice in case of disconnection of the line and/or to allow safety through the ground connection. For the best management of the electrical system, in relation to the presence of overvoltages caused by grid operations or lightning strikes, special equipment, called surge arresters, may also be installed.

The set of circuit breaker, disconnectors, current transformers, voltage transformers and surge arresters present in the electrical substations at each end of the line is defined as a line bay or line riser, and is usually realized on the ground, binding the equipment to special metal supports. These supports ensure, by elevation from the ground, the electrical safety clearances between the live parts and the personnel and the related transport vehicles and on-track machines used in the electrical substations.

In electrical substations, circuit breakers and disconnectors of the line bay may be operated in three ways: manually, by means of mechanical levers or actuators placed in control cubicles on board the equipment, locally, through the protection, command and control system interface located in the electrical substation building, or remotely from remote control centers.

The circuit breaker and disconnector of the line bay may also be operated by the protection system, according to pre-established logic, enabled by remote commands or by abnormal voltage and current values. Said protection system is usually installed in buildings or cabins located near the line bay.

This solution is particularly expensive in terms of land occupation, and all the more so when every equipment of the line bay is independent of the other. Furthermore, said equipment must be protected from access by unqualified personnel by means of fences, which make it necessary for the electrical system operator to acquire the installation areas.

A solution for space reduction consists in using multi-function devices which, using better insulating fluids than air, combine various functions, for example that of a voltage and current transformer, i.e. they combine in a single device (switchgear unit) the circuit breaker, line and busbar disconnectors and earthing switches. These aggregate solutions make it possible to reduce the portion of land to be allocated to the equipment but still need to be installed on the transmission grid operator's land, within a fenced perimeter. Within this segregated area it is also necessary to install buildings, bound to the ground, to house the protection, command and control system, as well as the telecommunication systems serving the line bay.

Furthermore, during the evolution of the electrical system, it may be necessary to connect new active users to the electrical grid, such as, for example, power plants and generation plants from renewable energy sources, or new passive users, such as primary substations for the distribution of electricity and energy-intensive industries. The preferred solution of the prior art consists in realizing an electrical substation at the location of the new user which is then connected with two lines to two distinct substations of the high-voltage grid. This solution, defined as "loop-in loop-out", involves a significant land occupation, both for the construction of the new substation and for the double connection to the transmission grid.

In order to contain land use and construction costs, a solution widely used in the past consisted in connecting the new user to the nearest pre-existing transmission line of the high-voltage grid, by directly connecting the new conductors to the old ones, or by interposing simple, manually operated disconnectors.

However, said configurations of lines with three or more ends are particularly burdensome for the grid operator in terms of operational flexibility, working times and rapidity of fault extinction.

In order to remedy these operational limitations, it is common practice to install switchgear units on raised platforms, crossarms or cantilevered reticular beams, also anchored to the towers of said lines. However, even these solutions have, among others, the following drawbacks:
- the overall dimensions of the tower are increased due to the necessary presence of further crossarms or cantilevered reticular beams, specially made to anchor said switchgear units;
- the construction and operation cost is high, as the forces acting on the tower are greater due to the positioning of the switchgear unit offset from the center of gravity of the tower.

Some examples of known solutions may be found in documents XP055692863, XP055692875, FR 2 706 674 A1 and U.S. Pat. No. 4,956,742 A, however the aforesaid problems still remain unresolved.

SUMMARY OF INVENTION

An object of this invention is therefore to provide an electrical arrangement of the components typically present in a line bay, and of the respective protection, command and control system, which allows their installation inside a tower of the transmission grid, also making use of a multifunction device (switchgear unit).

A further object of this invention is to provide a tower adapted to accommodate, in the form of a switchgear unit, the components typically present in a line bay, as well as the respective protection, command and control system, ensuring dimensions comparable to those of a typical tower of the high-voltage transmission grid, reducing, with respect to solutions of the prior art characterized by the presence of crossarms or cantilevered reticular beams for anchoring said switchgear units:
- the size and visibility of the tower;
- the mechanical performance required of the tower;
- the construction and operational costs;
- the land use, as it is limited to only the foundations of the tower which have dimensions comparable to that of traditional towers.

A further object of this invention is to provide a tower equipped with a switchgear unit and the respective protection, command and control system which may be installed in place of an existing ground line bay or as a new line bay, conserving the use of land.

A further object of this invention is to provide a tower equipped with a switchgear unit and the respective protection, command and control system, to be installed in place of a pre-existing tower of the transmission grid, in order to connect new users to a pre-existing line of the electrical grid. With this solution, considerable benefits in terms of operational flexibility and selectivity in fault extinction are introduced compared to the traditional solution based on manual disconnectors, while keeping the overall dimensions substantially unchanged compared to traditional towers.

A further object of this invention is to provide a tower equipped with a switchgear unit and the respective protection, command and control system, to be installed at pre-existing rigid user connections (T-shaped) or managed by manual disconnectors, in order to introduce the benefits of operational flexibility and selectivity in fault extinction typical of a line bay. This installation may take place by adding a new tower to the line or by replacing a pre-existing tower, ensuring, in the second case, a substantial invariance of the land used.

A further object of this invention is to reduce the working times for the transmission grid operator and the time-periods wherein a transmission line with branches remains cut-off, in the event of maintenance and or repair of any damage along said line, in order to contain the amount of indemnities and penalties requested from the transmission grid operator (following power outage of the users) and to avoid possible potential damage to the users' plants connected to the high-voltage grid resulting from prolonged power outages.

The aforesaid and other objects and advantages are achieved, according to an aspect of the present invention, by a tower as described and claimed herein. Preferred embodiments of the present invention are also described.

BRIEF DESCRIPTION OF THE DRAWINGS

The functional and structural features of some preferred embodiments of a tower of the high-voltage transmission grid according to the invention will now be described. Reference is made to the accompanying drawings, wherein:

FIG. 1.A shows the general single-line electrical diagram of a line bay connecting a high-voltage line to a high-voltage busbar of an electrical substation;

FIG. 1.B shows an electric connection line between two high-voltage electrical substations;

FIG. 1.C shows the connection of a user to the electric line of FIG. 1.B by making two new sections of line in "loop-in loop-out" configuration;

FIG. 1.D shows the connection of a user to the electric line referred to in FIG. 1.B through the creation of a single new line section, forming a T-branch with disconnectors that may be operated at no-load, upstream and downstream of the branch;

FIG. 5.A shows an example of architecture of a protection, command and control system, optimized for tower installation;

FIG. 5.B shows the extension of the architecture of the protection, command and control system optimized for tower installation, with equipment for interfacing and signal transmission to other remote systems;

FIGS. 9.A, 9.B, 9.C show different configurations of the tower-top hamper accommodating the switchgear unit in order to ensure the best compatibility of the solution with the territory.

DETAILED DESCRIPTION

Before describing in detail a plurality of embodiments of the invention, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

Figure 1:
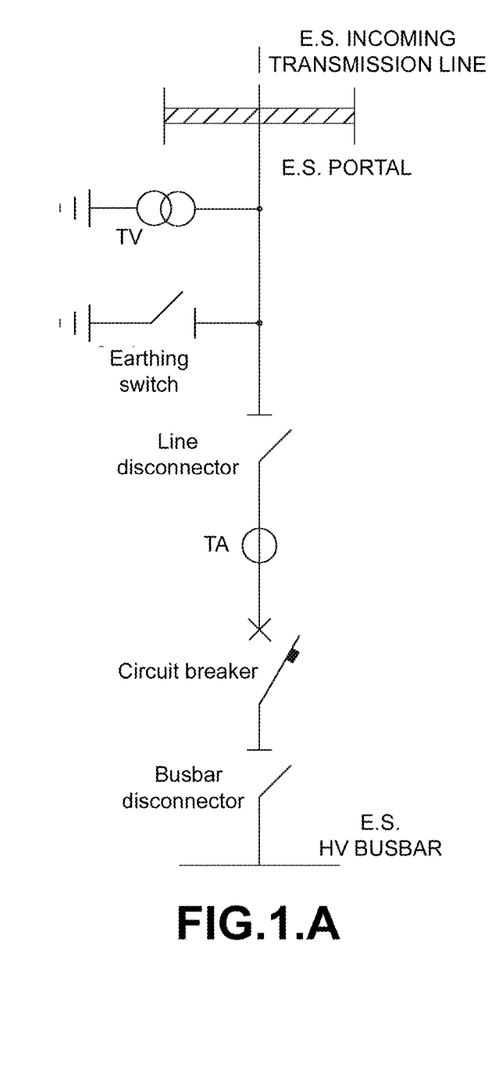
Figure 2:
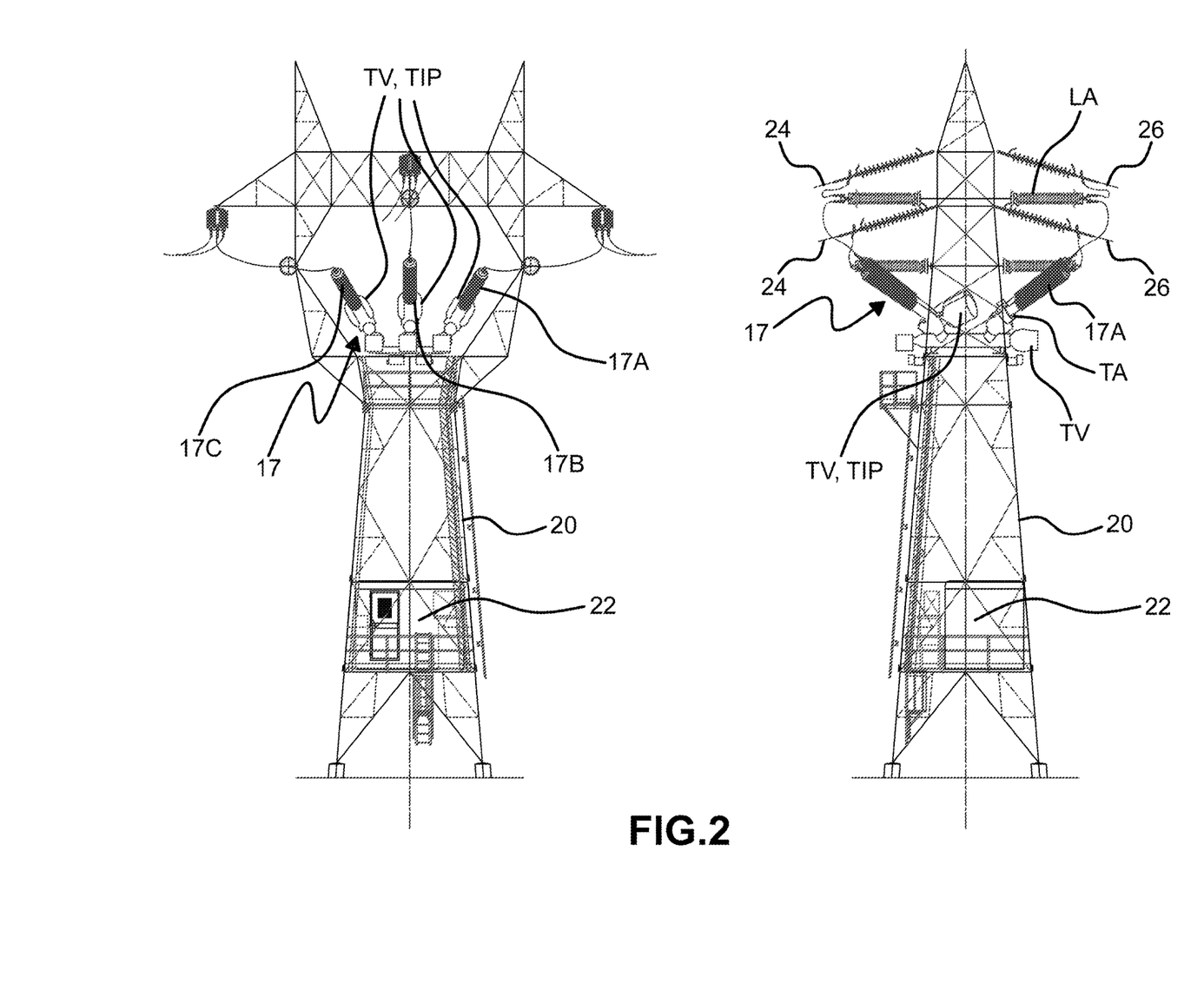
FIG. 2 shows a tower according to this invention, equipped with a switchgear unit and the related protection, command and control system.

Referring initially to FIG. 2, a tower 20 is shown for an overhead electric line, particularly for a high-voltage electric transmission line.

This tower has a predetermined shape arranged to define an inner volume of said tower, and carries a first tension side of a first line section 24 and a second tension side of a second line section 26. The first tension side and the second tension side comprise respective pluralities of first and second tension terminals, each associated with a respective phase of the high-voltage overhead electric transmission line. The tower is specially designed to house, within said inner volume, a switchgear unit 17 suitable to allow the reconfiguration of the high-voltage transmission grid. The switchgear unit 17 is connected at a first end to the first line section 24 and at a second end to the second line section 26.

The switchgear unit will be installed directly on the tower.

Moreover, the installation of the switchgear unit inside the shape of the tower, without the need to install crossarms or cantilever beams, ensures a placement in a more barycentric position to minimize the structural requirements of the tower as well as ensuring less visual interaction and a lower construction cost. For example, the tower may be a lattice tower and the equipment may be covered by the lattice of said tower.

Switchgear unit 17 refers to a system composed of several electrical switchgear devices, immersed in an insulating fluid, and enclosed within metal casings. The switchgear unit comprises the functions of circuit breaker, disconnector and, if necessary, earthing switch in a single system.

The activation of the aforesaid functions is motorized, with the possibility of manual movement in the absence of a power supply. The activation of the electrical switchgear equipment allows the switchgear unit to interrupt the no-load, nominal and short-circuit currents of the transmission line on which it is used, to disconnect (electrically isolate) the circuits connected upstream and downstream of the contacts, ensuring the insulation clearances, or to establish electrical continuity therebetween.

The switchgear unit is, therefore, a system capable of modifying the configuration of the high-voltage transmission grid, by acting on the electric line wherein it is installed, through the interruption and restoration of electrical continuity at pre-established points of the line, interrupting the nominal and fault currents, and carrying out safety measures by disconnecting and grounding parts of the system.

The switchgear unit is configured as a compact and multifunctional system of the modular type on which additional modules, such as protection and power transformers, may be installed to perform all the functions typically present in a bay of an electrical substation.

As may be seen in FIG. 2, the switchgear unit 17 includes a plurality of switchgear unit poles 17A, 17B, 17C, each associated with a respective phase of the high-voltage overhead electric transmission line 1. Each of the switchgear unit poles 17A, 17B, 17C comprises a line circuit breaker 50 and at least one line disconnector 52. Said line disconnector is adapted to switch between a condition of continuity of the line and a condition of disconnection thereof, with the further possibility of ground connection.

The line disconnectors 52 of each of the switchgear unit poles 17A, 17B, 17C, maybe two, namely, a first line disconnector 52' upstream of the circuit breaker 50 of the respective switchgear unit pole 17A, 17B, 17C and a second line disconnector 52" downstream of the same circuit breaker 50.

Figure 3:
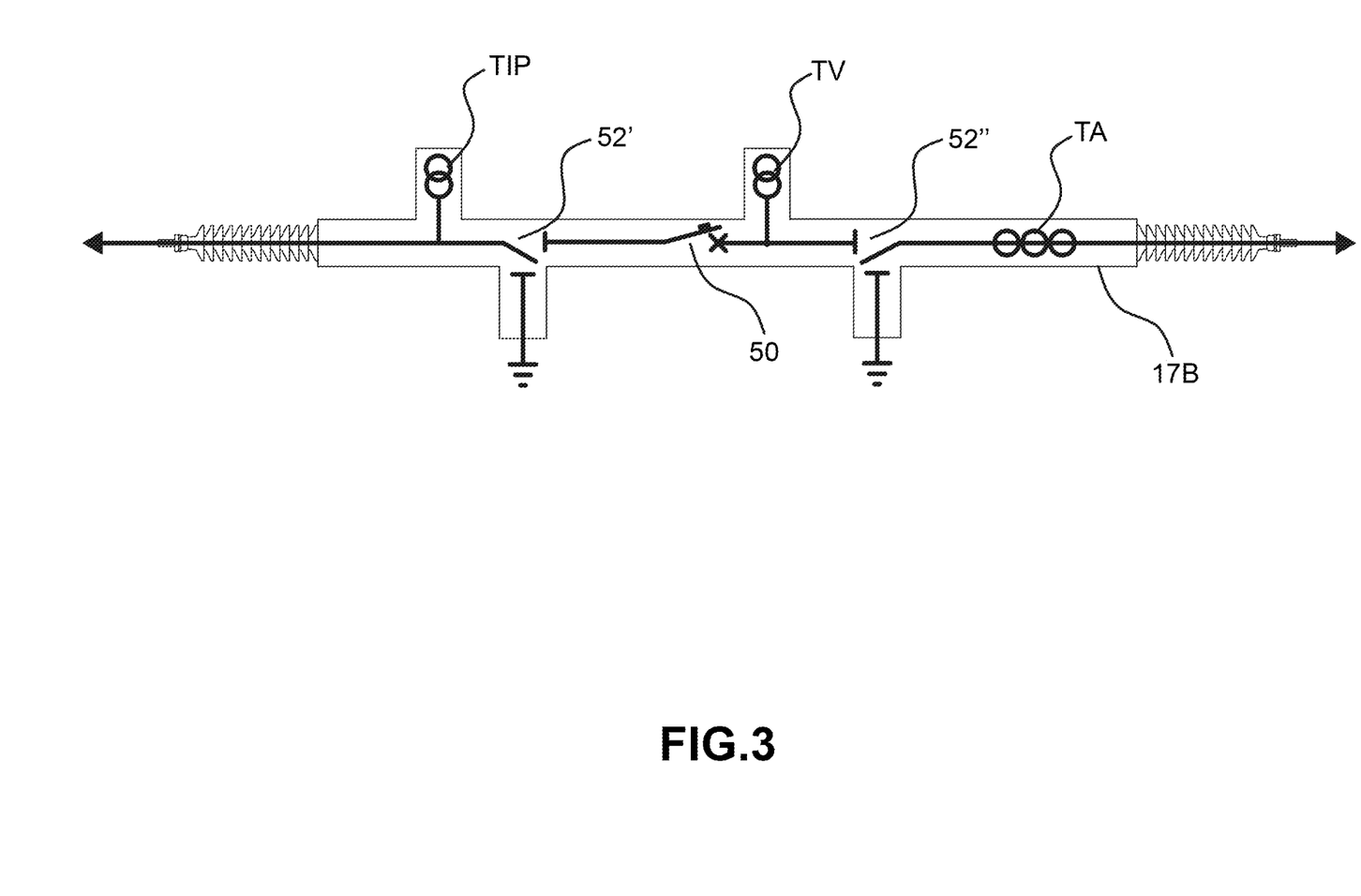
FIG. 3 shows the single-line electrical diagram of a switchgear unit pole equipped with a Current Transformer TA, a Voltage Transformer TV and an Inductive Power Transformer TIP.
Figure 4:
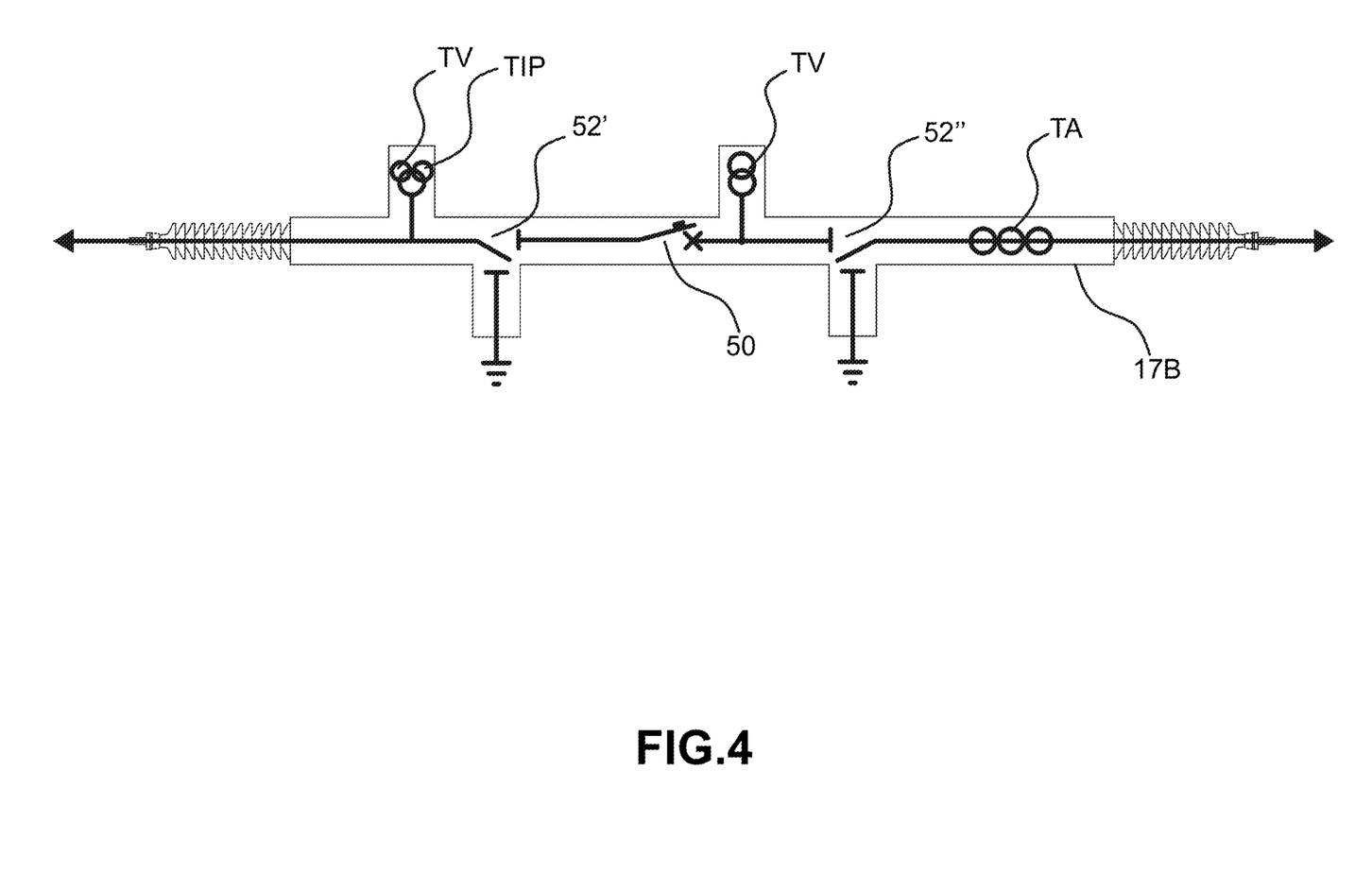
FIG. 4 shows the single-line diagram of a switchgear unit tower equipped with a current transformer TA, a voltage transformer TV and an inductive power transformer TIP, as well as an additional protective winding made in the Inductive Power Transformer TIP to allow the comparison of the electric voltages upstream and downstream of the circuit breaker, enabling the synchronism to be controlled during the closure of the circuit breaker.
Figure 5A:
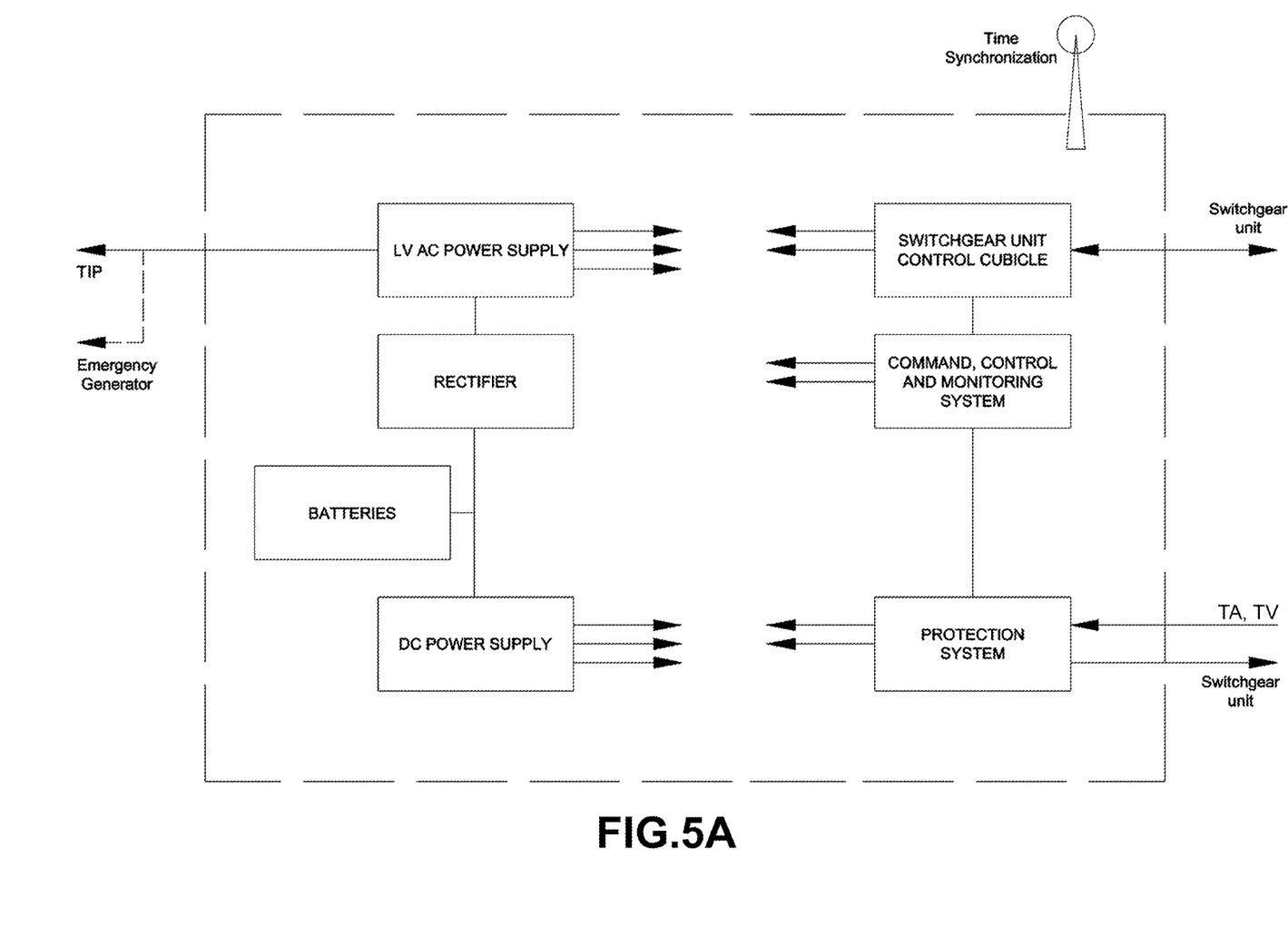
Figure 5B:
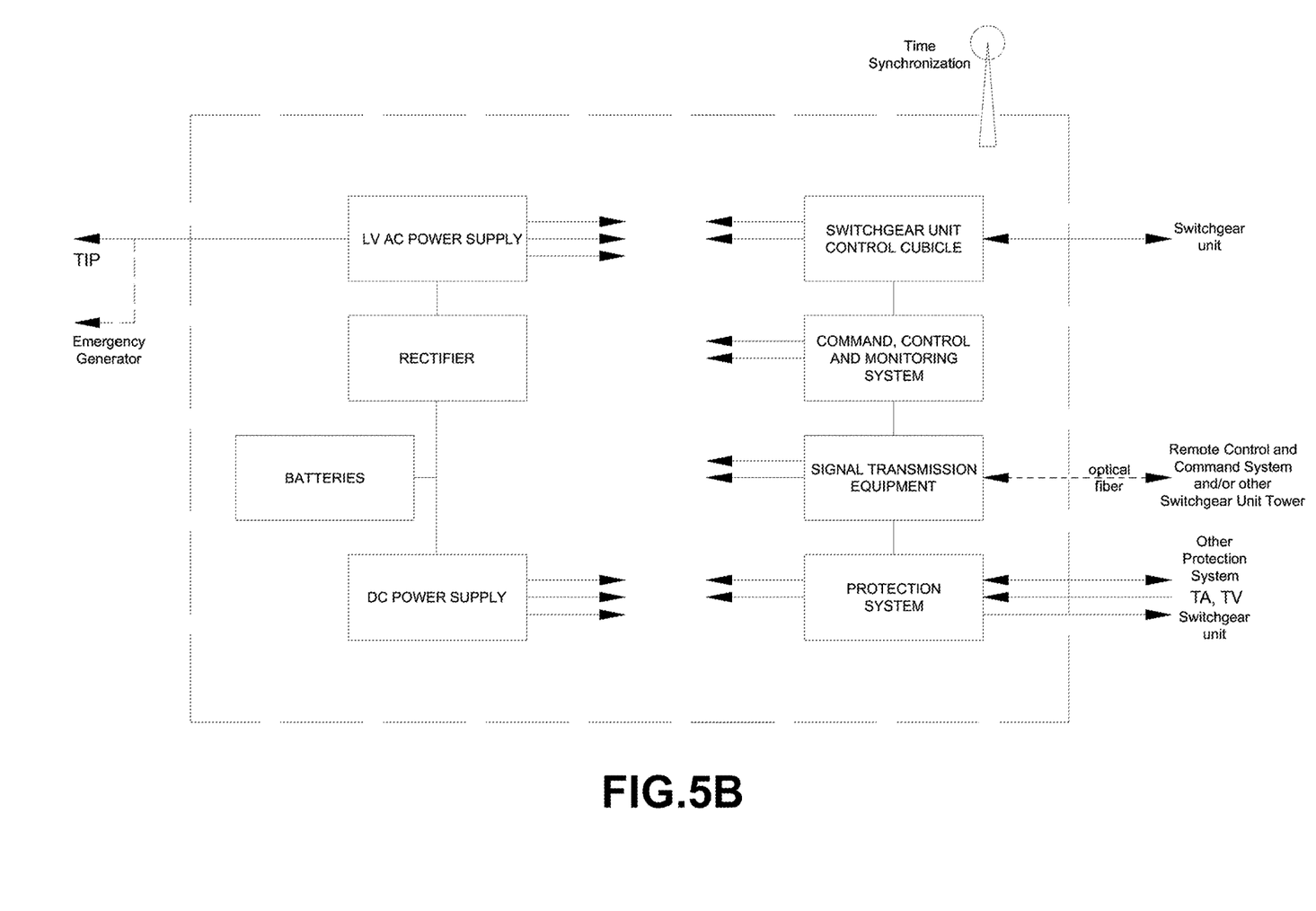

As shown in FIGS. 3 and 4, the switchgear unit 17 may comprise at least one current transformer TA, arranged for detecting the electric current of a phase of the high-voltage overhead electric transmission line 1, both in normal and fault conditions. These current detections are provided to allow monitoring of the line status, identification of the fault condition and location of the fault.

As shown in FIGS. 3 and 4, the switchgear unit 17 may also comprise at least one first voltage transformer TV, arranged to detect the electric voltage of a phase of the high-voltage overhead electric transmission line 1, both in normal and fault conditions. These voltage detections are provided to allow monitoring of the line status, identification of the fault condition and location of the fault.

As illustrated in FIG. 4, the switchgear unit 17 may comprise at least a second voltage transformer TV associated with one of the switchgear unit poles 17A, 17B, 17C thereof. With reference to the circuit breaker 50 of the switchgear unit pole 17A, 17B, 17C, the first voltage transformer TV will be installed on one end of the switchgear unit pole 17A, 17B, 17C with which it is associated, and the second voltage transformer TV will be installed on the opposite end of the switchgear unit pole 17A, 17B, 17C with which the first transformer TV is associated.

The second voltage transformer TV is provided to enable an electrical synchronism check between the line section upstream and the line section downstream of the switchgear unit, preliminary to the correct closing operation of the circuit breaker 50 of each switchgear unit pole 17A, 17B, 17C.

To protect the switchgear unit from impulse overvoltages due to lightning strikes or the operation of electrical devices, surge arresters LA may also be installed on the tower, upstream and downstream of the switchgear unit, for example, in horizontal position.

If the switchgear unit 17 were installed on the ground, near a tower or in an electrical substation, it would involve a considerable occupation of land and would require protection and isolation from access by unauthorized personnel, making its installation only possible on land owned by the transmission line operator.

By installing the switchgear unit directly on a tower, space and land use is reduced. The occupied land is in fact limited to the sole encumbrance of the foundations of the tower adapted to accommodate the switchgear unit, which is comparable to the land typically occupied by a tower made according to the prior art.

By installing the switchgear unit directly on a tower, in a position raised from the ground, it is not necessary to introduce fences, as the switchgear unit is made inaccessible by the raised position and by the climbing deterrent devices of the pole. Therefore, the installation may also take place on land not owned by the electric line operator, granted to the same through an act of easement, as is customary for the towers of the high-voltage grid forming part of the prior art.

By installing the switchgear unit directly on a tower, it will also be possible to speed up the authorization process for the construction and execution of the work.

This tower, equipped with a switchgear unit, may be used in a high-voltage overhead electric transmission line 1, which extends from a first electrical substation 3 to a second electrical substation 5, either as a replacement for a line bay within the electrical stations 3, 5 or as a terminal line bay of a new branch made along the line. In the latter case, the tower equipped with a switchgear unit may be positioned at the electrical substation of an active or passive user or at a third electrical substation of the grid operator or at a primary station 8 which is to be connected to the electric line.

This tower may be used in a high-voltage overhead electric transmission line, which extends from a first electrical substation 3 to a second electrical substation 5, and which has rigid T-branches along its path; in this context, the tower equipped with a switchgear unit may replace an existing tower of the line to increase its operational flexibility and selectivity in identifying faults.

This tower may be used in a high-voltage overhead electric transmission line, which extends from a first electrical substation 3 to a second electrical substation 5, and which has branches along its path that may be reconfigured by means of manual disconnectors; in this context, the tower equipped with a switchgear unit may be substituted for each of the towers equipped with said manual disconnectors to increase the operational flexibility of the electrical backbone and to allow the identification and selective and automatic extinction of faults.

Figure 9:
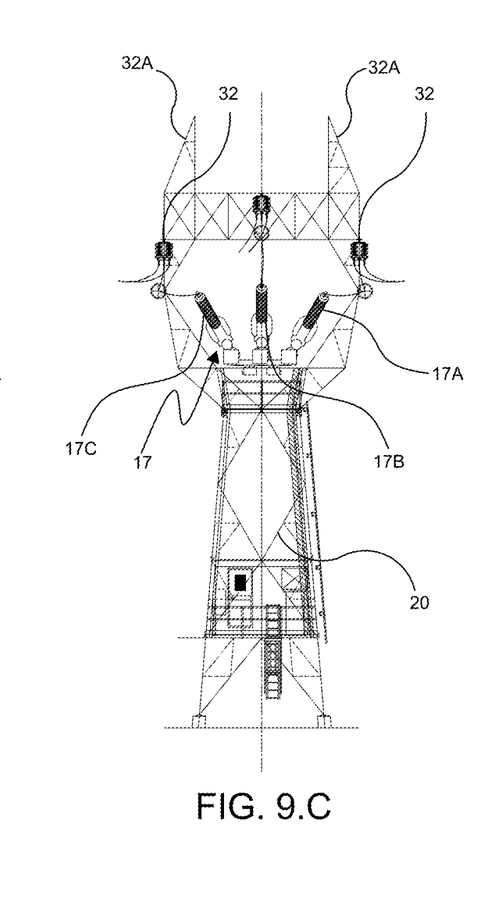

This tower may be installed in various configurations. Referring to FIG. 9.A, this tower may be installed by further spacing the tension points of the conductors of the electric line in order to increase, due to the greater distance between the electrical phases, the resilience even in unfavorable climatic, wind and environmental conditions. This configuration may be obtained by tensioning the phases arranged externally to the tip 31 of the crossarms of the tower. With reference to FIG. 9.B, this tower may be installed by closing the conductors of the phases arranged externally of at least one of the two sections of the electric line 24, 26, at the tower body 32, in order to contain, due to a reduction in the relative distance between the phases, the magnetic fields generated by the transmission line. In this configuration, it is also possible to ensure maximum resilience, by offsetting the ground wires from the vertical plane on which the externally arranged phases lie, by means of coupling formations on the tower, which allow the relocation of the earth wire peaks 31A, 32A as evident from the comparison between FIG. 9.A and FIGS. 9.B and 9.C.

With reference to FIG. 9.C, in the event that both sections of the electric line 24, 26 are tensioned to the tower, this tower may also be installed without side crossarms, in order to ensure the least visual interaction with the territorial context. With reference to FIGS. 9.A, 9.B and 9.C, this tower allows the conductors to pass from one configuration to the other even after the construction thereof, given the presence of the appropriate coupling formations. These coupling formations are suitable for anchoring the tension terminal of the externally arranged phases of at least one of the two sections of the electric line 24, 26 to the tower body 32 or the tip 31 of the crossarms of said tower, and at least one ground wire according to different configurations 31A, 32A, depending on the spatial arrangement of the aforesaid external phases of the two sections of the electric line 24, 26.

In light of the above, it is clear that there may be for example the following three possibilities:
1) the externally arranged phases of the two sections of the electric line 24, 26 are both anchored to the tower body 32;
2) the externally arranged phases of one of the two sections of the electric line 24, 26 are both anchored to the tower body 32 and the remaining section of the electric line 26, 24 is anchored to the tip 31 of the crossarms;
3) the externally arranged phases of the two sections of the electric line 24, 26 are both anchored to the tip 31 of the crossarms.

Moreover, the crossarms may have a single tip, for example in the case of triangular-shaped crossarms according to the plan view, to which both sections of the electric line 24, 26 may be tensioned, or two tips, for example in the case of rectangular crossarms according to the plan view, to which the sections of the electric line 24, 26 may be tensioned respectively.

The switchgear unit may be controlled locally by mechanical levers or by a motorized drive.

In a further aspect, the tower may include, within the volume defined by the mechanical structure of the tower, a protection, command and control system of the switchgear unit 17 for the operation of the sections of the transmission line. Operation of the sections forming the transmission line means opening/closing, disconnection and grounding of the system. These actions may result in the interruption of the no-load, nominal or fault current of the line (typically, for example, following a phase-to-ground fault).

The protection, command and control system may be equipped with line protections, i.e. devices for processing the voltage and current measurements coming from the current transformers TA and the voltage transformers TV, installed on the switchgear unit, also assuming protective functions. These devices are used to identify anomalous values in the detection of currents and voltages of the line, to interpret them for the purpose of identifying malfunctions and localizing the fault condition, and to generate alarms and/or opening commands of the switchgear units and of the facing circuit breakers, adapted to extinguish these faults and malfunctions selectively.

In a further aspect, the protection, command and control system may exchange protection and/or command and control signals, through an optical fiber installed in a ground wire of the high-voltage overhead electric transmission line or in special optical cables. These signals are exchanged with other towers equipped with switchgear units and respective protection, command and control systems, located along the high-voltage electric transmission line, or with electrical substations 3, 5, 8 pertaining to the ends thereof. This signal transmission/reception enables coordinated management of said switchgear units and of the circuit breakers of the facing electrical substations 3, 5, 8, also automatically, according to preset logics. Coordinated management refers to the simultaneous operation of two or more switchgear units or of said switchgear units and of the circuit breakers of the facing electrical substations (3, 5, 8), according to preset logics for grid protective or operational purposes.

According to one of the applications, the operational status of the switchgear unit 17 may also be controlled and managed remotely through a remote control and command system. This remote control and command may take place via fiber optic communication. Said optical fiber forms a LAN data transmission network distributed along the line on which said towers equipped with switchgear units are installed.

In the case of switchgear units installed along an electric line, the remote control and command system may be arranged in at least one of the electrical substations located at the ends of the electric line to which the tower that is the subject of the invention belongs. The remote control and command system may also be relocated to combined command and control centers such as the control rooms of the grid operator.

Figure 6:
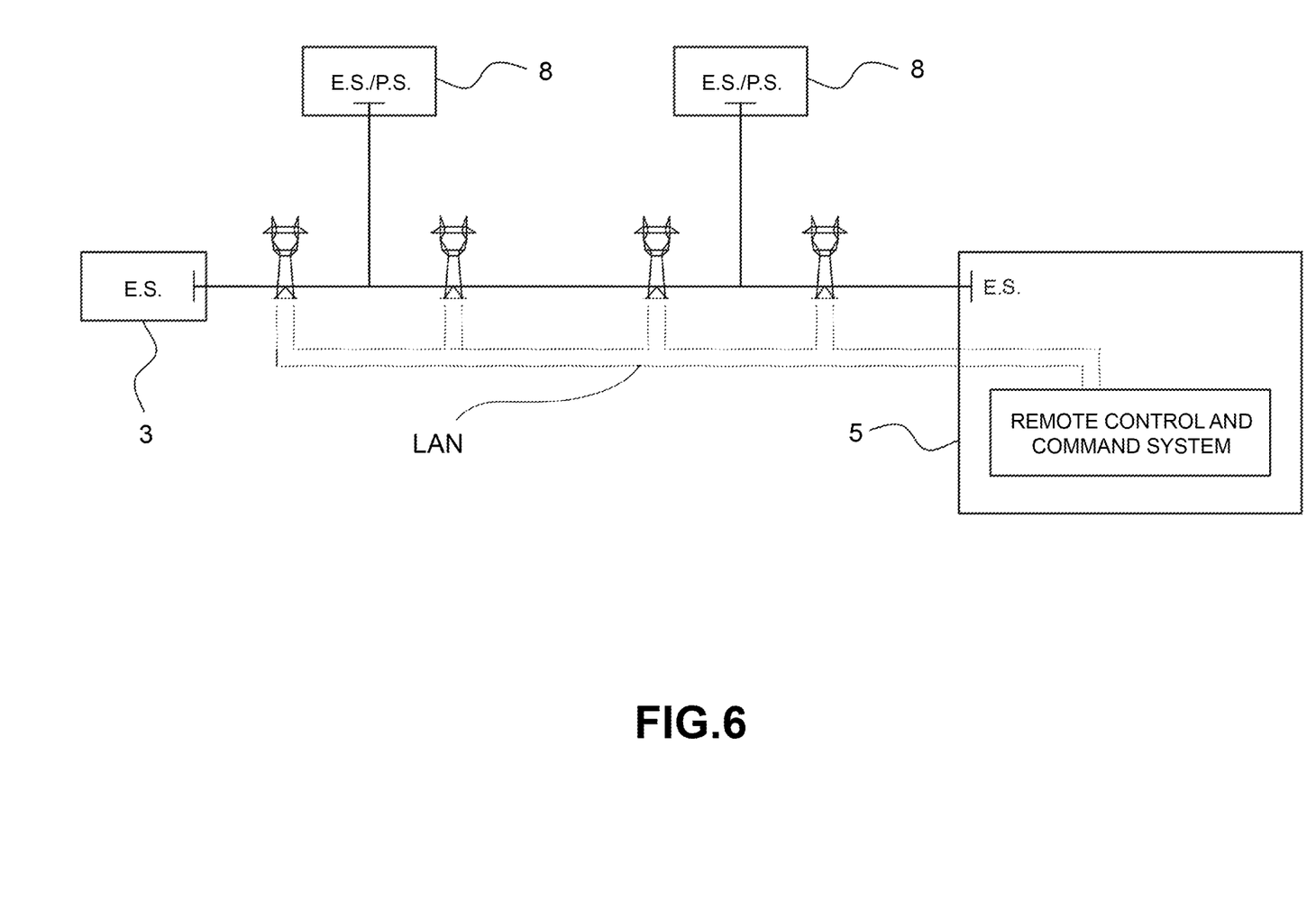
FIG. 6 shows an embodiment of a fiber-optic LAN data network distributed along the electric line for communication between the remote control and command system and the protection, command and control system of the tower equipped with a switchgear unit.
Figure 7:
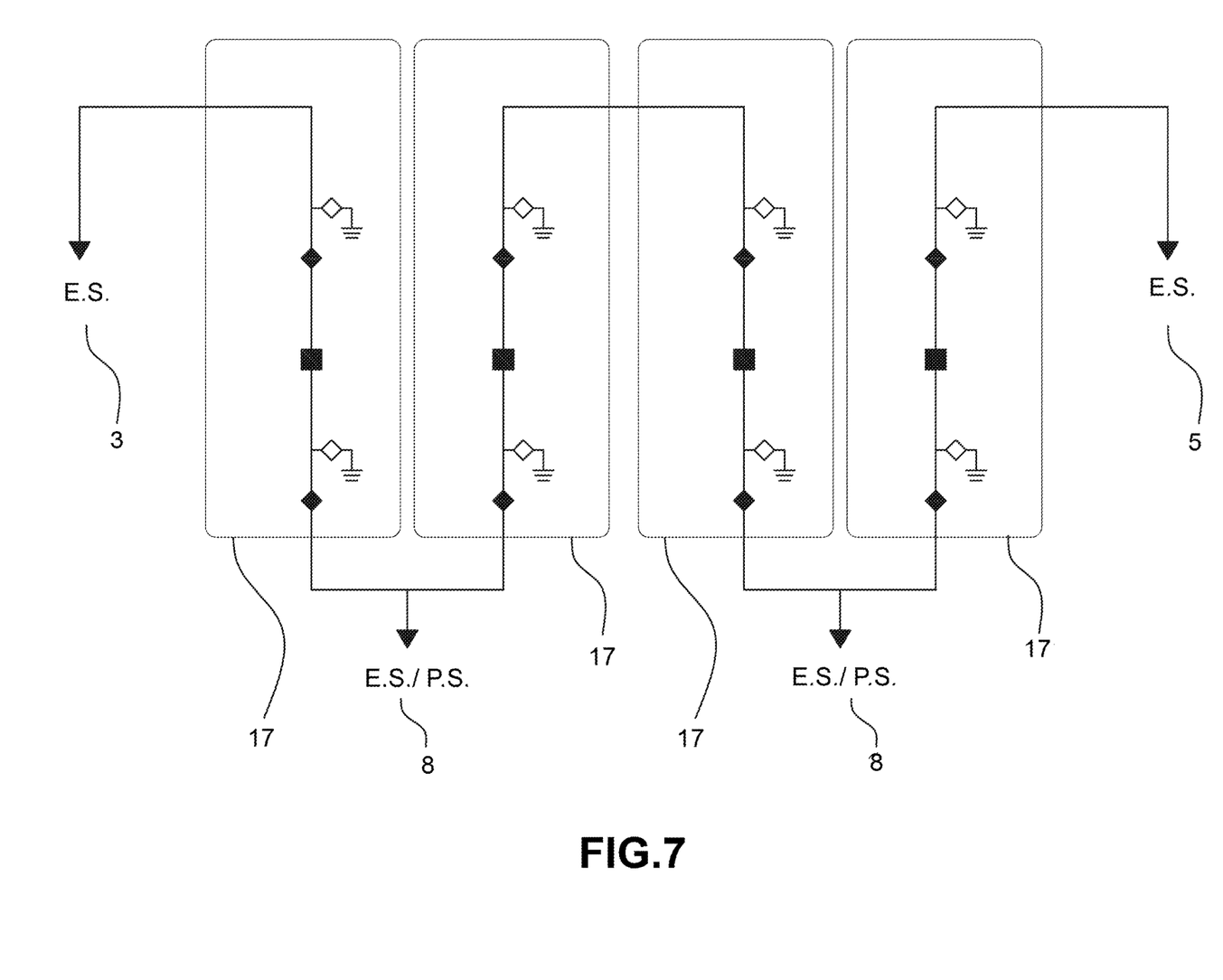
FIG. 7 shows an example of the remote control and command system interface in the case of a line equipped with two user branches.

An example of a graphic interface of a remote control and command system for a line equipped with two branches to which as many users are connected is shown in FIG. 7; said branches may be configured by means of two towers (with one switchgear unit each), one placed upstream and one downstream of each branch (FIG. 6). This interface shows the entire transmission line, and, in particular, the four switchgear units, identifiable by the rectangular perimeter with rounded corners 17, are shown. Line circuit breakers are indicated with squares and disconnectors with rhombuses. The operator may determine the open/closed status of the circuit breakers and disconnectors on the basis of the color assumed by the respective rhombus or square. By clicking on said rhombus or square, the operator may change its operational status.

According to a further application, the switchgear unit 17 may comprise at least one inductive power transformer TIP for drawing electrical power directly from a phase of the high-voltage transmission line 1 to which the tower is connected, in order to power the switchgear unit 17, the protection, command and control system and the interfacing and signal transmission equipment, when present.

With respect to the supply procured by a local distributor, this power supply solution ensures greater resilience in adverse climatic and environmental conditions, as well as greater power supply security due to the direct drawing from the high-voltage line. The power supply from the inductive power transformer TIP allows for the installation of the tower equipped with the switchgear unit and the respective protection, command and control system even in places not easily accessible to low-voltage power supply from local distributor grids.

According to a further application, at least one of the voltage transformers TV is obtained with additional windings inside the inductive power transformer TIP, in order to reduce the overall dimensions, the cost and the visual interaction of the equipment that makes up the switchgear unit.

As may be seen from FIG. 2, the tower may comprise a kiosk 22, in which the protection, command and control system and the interfacing and signal transmission equipment may be arranged. The operator may then access the kiosk to command the switchgear unit, operating the local command and control devices directly, or to check the status of the protection equipment.

According to a further aspect of the invention, through communication with the protection, command and control systems of the other towers with switchgear units present on the same line, the protection, command and control system will allow the operator to view the operational status of said towers, in order to properly coordinate the status of the local switchgear unit according to the operational requirements.

According to a further aspect of the invention, the tower defines an internal volume where the switchgear unit, the protection, command and control system and the interfacing and signal transmission equipment are suitably located, preferably in a position raised from the ground, in order to limit the land occupation, simplify the authorization process for the construction of the tower and make it possible to install it even on land not owned by the electric transmission line operator.

Figure 8:
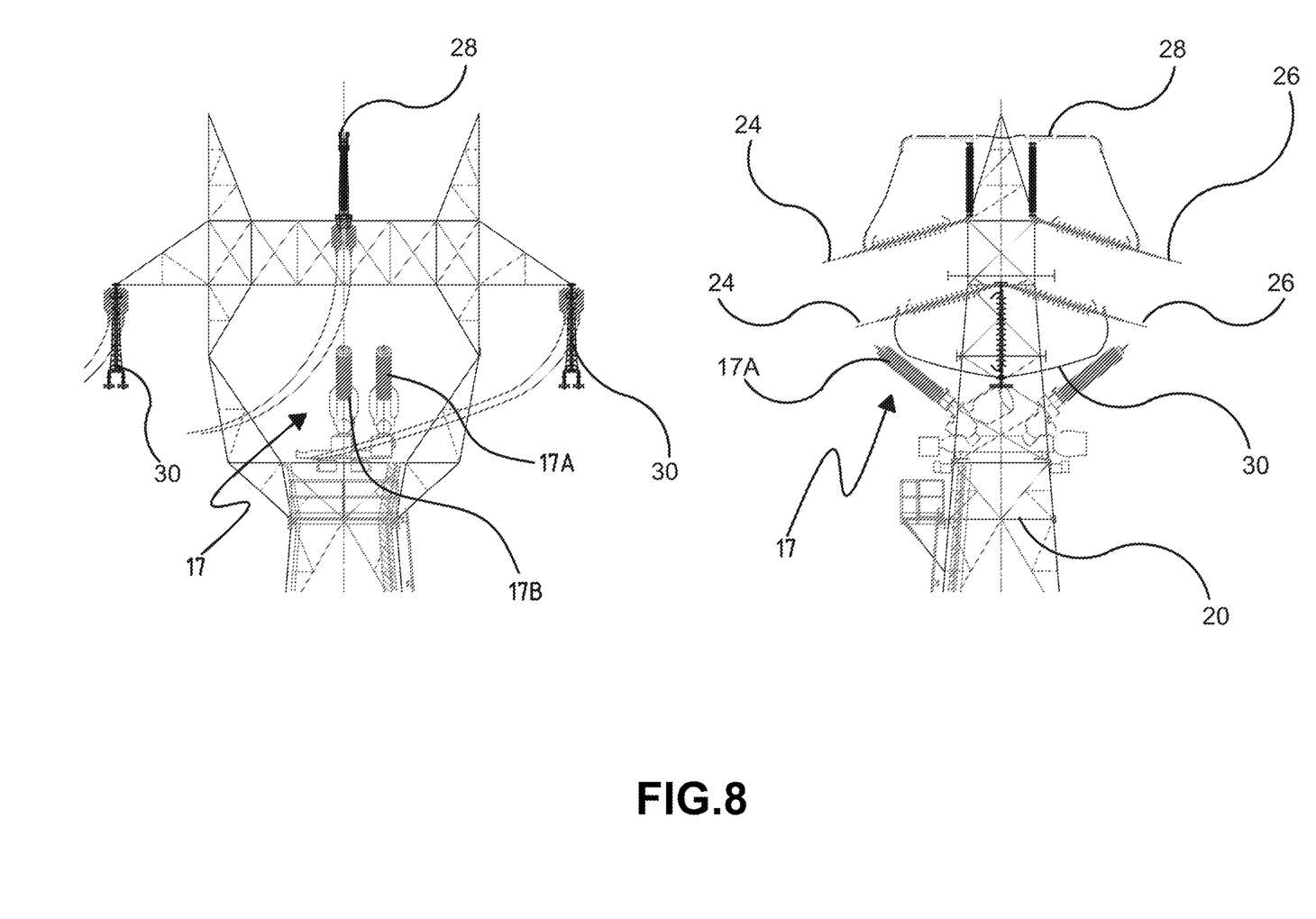
FIG. 8 shows the location on the tower of electrical bypass connections suitable to ensure the electrical continuity of the line to which the switchgear unit is connected, in the event of the absence or service disruption thereof, or malfunction of the protection, command and control system.

According to a further aspect of the invention, the tower has suitable arrangements in order to be equipped with electrical bypass connections adapted to ensure electrical continuity between the first line section 24 and the second line section 26 to which the switchgear unit 17 is connected, in case of absence or service outage of the switchgear unit 17 and malfunctioning of the attached protection, command and control system. These electrical bypass connections will make provisional connections between the first line section 24 and the second line section 26 with suitable "continuity connections" passing above 28 or below 30 parts of the tower. These "continuity connections" are adapted to ensure the continuity of the electrical backbone, in compliance with the standard electrical clearances, without requiring the complete removal of the switchgear unit 17.

In the case of electric lines with multiple ends, due to this invention, it is possible to install, at the rigid T-branches or T-branches equipped with manual disconnectors only, towers with devices capable of automatically identifying and extinguishing faults, remotely/locally modifying the grid topology and remotely/locally isolating portions of the grid for maintenance.

The advantage achieved is, therefore, that of having obtained a tower which, ensuring a land occupation substantially equivalent to that of existing towers made according to the prior art, may be installed on areas also not owned by the operator and which reduces working times and time-periods wherein the transmission line to which it belongs remains disconnected in the event of maintenance and/or repair of any faults. This results in a significant reduction in the indemnities and penalties requested from the transmission grid operator and a reduction in the probability of damage to the user's plants due to prolonged power outage.

The proposed tower may also be used as a line bay in an electrical substation or as a high-voltage user riser, for example for the connection of active, passive users and primary substations to the high-voltage electric grid. The advantage consists in having placed on a tower all the equipment commonly present in a line bay as well as the respective protection, command and control system and the interfacing and signal transmission equipment, allowing the creation of new connections with reduced spaces and authorization times.

Various aspects and embodiments of a tower for the high-voltage overhead electric transmission grid according to the invention have been described. It is understood that each embodiment may be combined with any other embodiment. Furthermore, the invention is not limited to the described embodiments but may be varied within the scope defined by the appended claims.

The invention claimed is:

1. A tower for a high-voltage overhead electric transmission line,
wherein said tower has a predetermined shape defining an internal volume of said tower, and carries a first tension side of a first line section and a second tension side of a second line section, wherein said first tension side and said second tension side comprise respective pluralities of first and second phase tension terminals each associated with a respective phase of the high-voltage overhead electric transmission line;
said tower being configured to support, within said internal volume, a switchgear unit connected at a first end to said first line section and at a second end to said second line section;
said switchgear unit, being configured to modify a grid configuration, interrupting and restoring electrical continuity at predetermined points, interrupt nominal and fault currents, and carry out safety operations, through grounding, of the first or second line section;
the switchgear unit comprising a plurality of switchgear unit poles, each switchgear unit pole of said plurality of switchgear unit poles being associated with the respective phase of the high-voltage overhead electric transmission line; and each switchgear unit pole comprising a line circuit breaker and at least one line disconnector.

2. The tower of claim 1, comprising a protection, command and control system configured for managing the switchgear unit and operating the first and second line sections of the high-voltage overhead electric transmission line relating to the respective pluralities of first and second phase tension terminals.

3. The tower of claim 2, wherein the protection, command and control system mounted on the tower exchanges signals with protection, command and control systems of other towers, equipped with others of said switchgear unit, located along the high-voltage overhead electric transmission line and/or with protection, command and control systems of electrical substations pertaining to a same high-voltage overhead electric transmission line, through an optical fiber installed in a ground wire of the high-voltage overhead electric transmission line or in dedicated optical cables; and transmission/reception of signals enabling a coordinated management of switchgear units and circuit breakers installed in the electrical substations, also in an automatic manner and according to preset logics.

4. The tower of claim 2, wherein the switchgear unit is remotely tele-operated and tele-controlled, by a remote control and command system installed in a control room of a grid operator in charge of a territory through a control equipment located in at least one electrical substation.

5. The tower of claim 4, wherein the remote control and the command system in the control room of the grid operator communicates by an interfacing and signal transmission equipment via optical fiber with the protection, command and control system of the tower equipped with the switchgear unit; and said optical fiber creating a LAN data transmission network distributed along the high-voltage overhead electric transmission line on which towers equipped with switchgear units including the switchgear unit are installed.

6. The tower of claim 5, wherein the switchgear unit further comprises at least one inductive power transformer configured to take electrical power directly from one phase of the high-voltage overhead electric transmission line to which the tower is connected, to supply the switchgear unit, the protection, command and control system and the interfacing and signal transmission equipment.

7. The tower of claim 6, wherein the protection, command and control system and the interfacing and signal transmission equipment are suitably located within the internal volume of the tower and are suspended from a ground level, limiting an occupation of land to a foundation of the tower only.

8. The tower of claim 7, wherein said protection, command and control system and the interfacing and signal transmission equipment are enclosed within a kiosk, arranged in said internal volume of the tower.

9. The tower of claim 2, wherein said tower is equipped with electrical bypass connections, configured to ensure electrical continuity between the first line section and the second line section to which the switchgear unit is connected, in case of an absence or a service outage of said switchgear unit, or a malfunction of the protection, command and control system;

said electrical bypass connections connecting the first line section to the second line section with continuity connections passing above or below parts of the tower; and said continuity connections being adapted to ensure electrical continuity while respecting standard electrical insulation clearances, without requiring a complete removal of the switchgear unit.

10. The tower of claim 1, wherein the at least one line disconnector of each switchgear unit pole is two line disconnectors, a first line disconnector of the two line disconnectors upstream of the line circuit breaker of a respective one of the switchgear unit poles and a second line disconnector of the two line disconnectors downstream of a same line circuit breaker of the respective one of the switchgear unit poles.

11. The tower of claim 1, wherein the switchgear unit further comprises at least one current transformer for detecting an electric current of the respective phase of the high-voltage overhead electric transmission line, both in normal and fault conditions, the detected electric current allowing monitoring a line status, identification of a condition of a fault and a location of the fault.

12. The tower of claim 11, comprising a protection, command and control system configured for managing the switchgear unit and operating the first and second line sections of the high-voltage overhead electric transmission line relating to the respective pluralities of first and second phase tension terminals, and wherein the protection, command and control system is equipped with protection devices for processing the detected electric current coming from the at least one current transformer; and the protection devices being configured to identify the condition of the fault and generate alarms and/or an opening operation command of the switchgear unit for selective extinction of the condition of the fault.

13. The tower of claim 1, wherein the switchgear unit further comprises at least one first voltage transformer for detecting an electric voltage of the respective phase of the high-voltage overhead electric transmission line, both in normal and fault voltage conditions, the detected electric voltage allowing monitoring a voltage line status, an identification of a condition of a voltage fault and a location of the voltage fault.

14. The tower of claim 13, wherein the switchgear unit further comprises at least one second voltage transformer associated with one of the switchgear unit pole;

the at least one first voltage transformer being installed, with reference to the line circuit breaker of said switchgear unit pole, on one end of the switchgear unit pole with which the at least one first voltage transformer is associated, and the at least one second voltage transformer being installed on an opposite end of the switchgear unit pole with which the at least one first voltage transformer is associated; and said at least one second voltage transformer being configured to enable an electric synchronism check between a line section upstream and a line section downstream of the switchgear unit, to correct closing operation of the line circuit breaker of each switchgear unit pole, the line upstream is one of the first line section and second line section, and the line downstream is another of the first line section and second line section.

15. The tower of claim 14, comprising a protection, command and control system configured for managing the switchgear unit and operating the first and second line sections of the high-voltage overhead electric transmission line relating to the respective pluralities of first and second phase tension terminals, wherein the switchgear unit comprises at least one current transformer for detecting an electric current of the respective phase of the high-voltage overhead electric transmission line, both in normal and fault current conditions, the detected electric current allowing monitoring a current line status, an identification of a current fault condition and a location of the current fault, and wherein the protection, command and control system is equipped with protection devices for processing the detected electric voltage and the detected electric current coming from the at least one first voltage transformer, a detected electric voltage coming from the at least one second voltage transformers and the detected electric current coming from the at least one current transformer; and the protection devices being configured to identify the voltage and current fault conditions and generate alarms and/or an opening operation command of the switchgear unit for selective extinction of the voltage and current fault conditions.

16. The tower of claim 13, comprising a protection, command and control system configured for managing the switchgear unit and operating the first and second line sections of the high-voltage overhead electric transmission line relating to the respective pluralities of first and second phase tension terminals, wherein the protection, command and control system is equipped with protection devices for processing the detected electric voltage coming from the at least one first voltage transformers; and the protection devices being configured to identify the condition of the voltage fault and generate alarms and/or an opening operation command of the switchgear unit for selective extinction of the condition of the voltage fault.

17. The tower of claim 1, wherein each of the respective pluralities of first and second phase tension terminals include:

a center phase tension terminal of the respective phase of the high-voltage overhead electric transmission line that is centrally arranged on the tower, and outer phase tension terminals of a pair of the respective phases that are externally arranged on either side of the tower with the center phase tension terminal in between, the outer phase tension terminals of at least one of the first or second line sections configured to anchor at a tower body or at a tip of tower crossarms, and the tower further includes a ground tension terminal of at least one ground wire, the ground tension terminal configured to anchor the at least one ground wire according to different arrangements, depending on spatial arrangement of the externally arranged phases of the first and second line sections.

18. The tower of claim 1, comprising surge arresters which are connected upstream and downstream of the switchgear unit, respectively, to protect said switchgear unit from overvoltages.

* * * * *